United States Patent
Carver (12)

(10) Patent No.: US 6,575,401 B1
(45) Date of Patent: Jun. 10, 2003

(54) VERTICAL-LIFT AND HORIZONTAL FLIGHT AIRCRAFT

(76) Inventor: Howard J. Carver, 4500 NW. Blitchton Rd., Lot #149, Ocala, FL (US) 34482

( * ) Notice: Subject to any disclaimer, the term of this patent is extended or adjusted under 35 U.S.C. 154(b) by 0 days.

(21) Appl. No.: 09/925,069

(22) Filed: Aug. 7, 2001

(51) Int. Cl.$^7$ ............................................... B64C 29/00
(52) U.S. Cl. .................... 244/12.2; 244/23 C
(58) Field of Search ............................ 244/12.2, 17.11, 244/17.23, 12.3, 23 C, 23 B, 130

(56) References Cited

U.S. PATENT DOCUMENTS

| | | | | |
|---|---|---|---|---|
| 2,863,621 A | * | 12/1958 | Davis | 244/12.2 |
| 2,935,275 A | * | 5/1960 | Grayson | 244/23 C |
| 3,002,709 A | * | 10/1961 | Cochran | 224/12.1 |
| 3,437,290 A | * | 4/1969 | Norman | 244/23 C |
| 3,997,131 A | * | 12/1976 | Kling | 244/23 C |
| 4,208,025 A | * | 6/1980 | Jefferson | 244/12.2 |
| 5,064,143 A | * | 11/1991 | Bucher | 244/12.2 |
| 5,149,012 A | | 9/1992 | Valverde | |
| 5,318,248 A | | 6/1994 | Zielonka | |
| 5,597,137 A | | 1/1997 | Skoglun | |
| 5,653,404 A | * | 8/1997 | Ploshkin | 244/12.2 |
| 6,270,038 B1 | * | 8/2001 | Cycon et al. | 244/12.2 |

\* cited by examiner

*Primary Examiner*—Galen L. Barefoot
(74) *Attorney, Agent, or Firm*—Russell W. Blum

(57) ABSTRACT

A vertical-lift and horizontal flight aircraft, which can be operated in a horizontal flight mode, as soon as ground clearance is made. And, because of its unique design is very stable in flight, is very light, has a low drag resistance factor and is versatile in the configurations that can be made from a basic platform. The aircraft is primarily disk shaped with the aircraft body in the center surrounded by a lift assembly housing, an outer body lift surface and a propulsion thrust unit mounted aft of the central body compartment. The lift assembly housing is parallel with the aircraft body and contains an inner drive ring, with attached lift blades, facing inward toward the body compartment and an outer drive ring, with attached lift blades, facing outward toward the outer body lift surface. Electromagnetic motors power each drive ring. The inner and outer lift assemblies are composed of a drive ring; lift blades, a drive ring guide-way and electromagnetic motors. The inner and outer drive rings counter-rotate to alleviate any possible torque effect. Each drive ring is controlled independently, and synchronized to achieve positive directional control. As the drive rings rotate, the attached lift blades move through the air to create lift. The pitch of the lift blades can be fixed or variable. Once the aircraft is airborne and the forward motion is attained, air moving over the outer body lift surface provides the lift for horizontal flight. An electric control mechanism will synchronize the speed of the two counter-rotating lift assembly drive rings for flight control purposes. This will allow the body to rotate, or maintain a steady course. Flight directional flaps will control the direction of the aircraft.

18 Claims, 8 Drawing Sheets

VERTICAL-LIFT AND HORIZONTAL FLIGHT AIRCRAFT

BACKGROUND OF THE INVENTION

This invention provides a new and improved aircraft lift system for vertical take off and horizontal flight. More importantly, the stability, safety and efficiency are significantly improved. All of which will lead to a revolutionary means of air travel.

Presently, helicopters are the most common vertical lift aircraft. They generally employ a single main rotor with a torque-compensating propeller on a boom at the rear of the helicopter body. The body of the helicopter is located below the main rotor and is connected to the rotor system by an engine and transmission assembly, which drives the rotor. This configuration creates a great deal of torque, which has been partially compensated by the rear rotor. However, due to the dynamics of the aircraft speed, wind velocity and the rate of climb, the torque affect is never completely resolved. Consequently, the helicopter is a very unstable aircraft with a corresponding low safety factor.

In addition, the rotor blades, generally between two and five in number, are long and heavy, and are connected to a single rotor hub, resulting in the rotor hub being heavily stressed and unstable. Damage to one of the rotor blades can create imbalances, which can destroy the entire rotor system. Normal vibrations are also very difficult to dampen. The rotor blades, being free at one end, are easily damaged upon impact. The torque-compensating propeller, located on the tail of the body, consumes a significant amount of engine power and adds to the overall weight.

This configuration does not lend itself to horizontal flight. The long rotating blades and the large frontal image, all contribute to excessive drag, thus decreasing efficiency and increasing instability. In addition, the weight of the engine, transmission and fuel, further decreases the efficiency and increases the instability of the aircraft.

The Marine Corp is currently supporting the development of a Tilt-Rotor type of aircraft, which is a combination of the helicopter and the airplane. Rotor blades are positioned at the tip of each wing to provide lift during takeoff and rotated 90 degrees for normal flight. For this system to work, the blade tilting on each wing must be precisely synchronized to prevent a rolling effect. Due to uncontrolled conditions, such as wind velocity, rate of climb and load distribution this aircraft has yet to be proven airworthy, even after decades of research. To date, many problems of stability have occurred, bringing into question its possible airworthiness. In addition the weight of the power plant, transmission and fuel, severally restricts the payload capacity and range of this aircraft.

The above discussion points out the problems and deficiencies of current design for vertical lift aircraft. The aircraft design is focused around the power available from the reciprocating engine and the jet engine. This configuration has been carried over into the design of unmanned aircraft, posing flight control problems as well as limitations on the stealth ability and the size of the aircraft. The weight of the power plant, transmission and fuel must to be overcome before any payload weight is added. Then again for each pound of payload, a corresponding increase in the power plant, transmission and fuel is necessary. Add to this is the need to increase the size and weight of the aircraft structure to house the power plant, fuel storage and payload. The resulting aircraft package becomes ever more weighty, expensive and unstable. In the case of the airplane, we incur an additional expense to provide for increasing the take-off and landing space. In general, the helicopter is excessively heavy; due to the weight of the engine, transmission and fuel; and very unstable due to the inability to completely resolve the torque effect.

SUMMARY OF THE INVENTION

These limitations have been recognized, and with the present invention a new and revolutionary concept for aircraft lift and propulsion is available. One that has drastically reduced the overall weight of the aircraft and has also overcome the serious affect torque has upon aircraft operation safety and stability. By drastically reducing the weight of the power plant and fuel, and eliminating any torque effect, we can use an entirely new approach to aircraft design. A design, which is very stable in flight; i.e. has a high safety factor; is very quiet, easy to operate and has vertical-lift and horizontal flight capability.

The concept of the instant invention is based upon recently developed technologies in high power, lightweight, electromagnetic motors, lightweight batteries and a lightweight high capacity generator. This combination has provided the means to change entirely the aircraft structure and to drastically reduce the weight of the aircraft. The resulting aircraft package offers greater efficiency in fuel consumption, thereby lowering the cost of operation, a significant improvement in operating stability; i.e. no torque effect; and is very quiet due to an all-electric implementation. The major benefit of this configuration is stability in flight, which means easier handling characteristics and a considerable improvement in the safety factor.

The basic concept of the instant invention is taken from the helicopter, in that the rotor blades of the helicopter act much like the wing of an airplane. The present invention has taken this same principle, and instead of a rotor, spinning overhead, counter-rotating lift blades, surrounding the main body of the aircraft, provide the means for take off and flight. Two counter-rotating drive rings drive the lift blades, which are shaped much like an aircraft wing. Electromagnetic motors supply the power to spin the lift blade drive rings at high speeds, providing the lift for take-off and horizontal flight. By varying the current to the electromagnetic motors, the speed of the rotating blades can be regulated. The forward motion and steering function is achieved by the use of directional guide flaps mounted under the periphery of the aircraft and adjacent to the lift blades. These flaps will deflect the air from the rotating blades to cause either a turning action or to propel the aircraft forward. With the flaps extended, the aircraft will lift vertically, or allow the craft to settle in for a landing.

A high-energy lightweight battery has been recently developed to provide the power to drive the electromagnetic motors. When additional payload and range requirements are needed, a lightweight fuel cell or generator are available as options. The aircraft configuration can vary according to mission requirements. For short-range reconnaissance missions, the battery will suffice to power the aircraft and keep the noise level down to a whisper. For greater payloads and extended flight, the electromagnetic motors can be increased in size or number of units. Also, an on board generator, fuel cell, or micro-turbine are available to provide for additional generator capacity. With this configuration, the battery gets a boost during lift off and is re-generated during flight, thereby providing an additional safety factor for landing. This combination of high power to weight ratio provides the efficiency and safety to enable the aircraft to lift vertically, cruise, and hover for extended periods of time.

Additionally, an external thrust unit or motorized ducted fan unit can be added. Several options are available, such as a jet engine, a micro-turbine, or a ducted fan unit driven by either an electric motor, or a gas or diesel powered engine.

The electromagnetic motors are housed within the lift assembly housing. Magnets, embedded within the inner and outer lift assembly drive rings, interact with the electromagnetic motors to propel the attached lift blades in a counter-rotating motion, resulting in aircraft lift. The electromagnetic motors are battery powered and may be re-generated with an on-board generator. The aircraft can be powered solely by battery or with a hybrid battery generator, and/or fuel cell. Additionally, the forward motion can be powered with just the battery, by a jet engine, a gas, diesel or electric motor ducted fan unit, or a micro-turbine.

Control of the angle of flight and the steering function is achieved by the use of directional guide flaps mounted under the periphery of the aircraft and adjacent to the lift blades. The flaps are independently controlled to provide complete control of the aircraft during vertical lift and horizontal flight. Air moving downward from the rotating lift blades, and deflected by the directional guide flaps will cause the aircraft to turn, lift, or to propel the aircraft forward. With the flaps extended, the aircraft will climb vertically, when power is applied, or descend when power is decreased allowing the craft to settle in for a landing.

The central body compartment is the load-carrying unit and contains the battery, and/or generator, fuel cell, or micro-turbine, flight control mechanisms and other payload items as determined by the mission requirements. The body is attached to the lift assembly housing by means of tubular attachment support members. These tubular attachment members are also used to carry motor control cabling, electrical wiring, flight control cabling and other control mechanisms.

BRIEF DESCRIPTION OF THE DRAWINGS

Referring now to the drawings wherein like elements are numbered alike in the several FIGURES.

DETAILED DESCRIPTION

Figure 1:
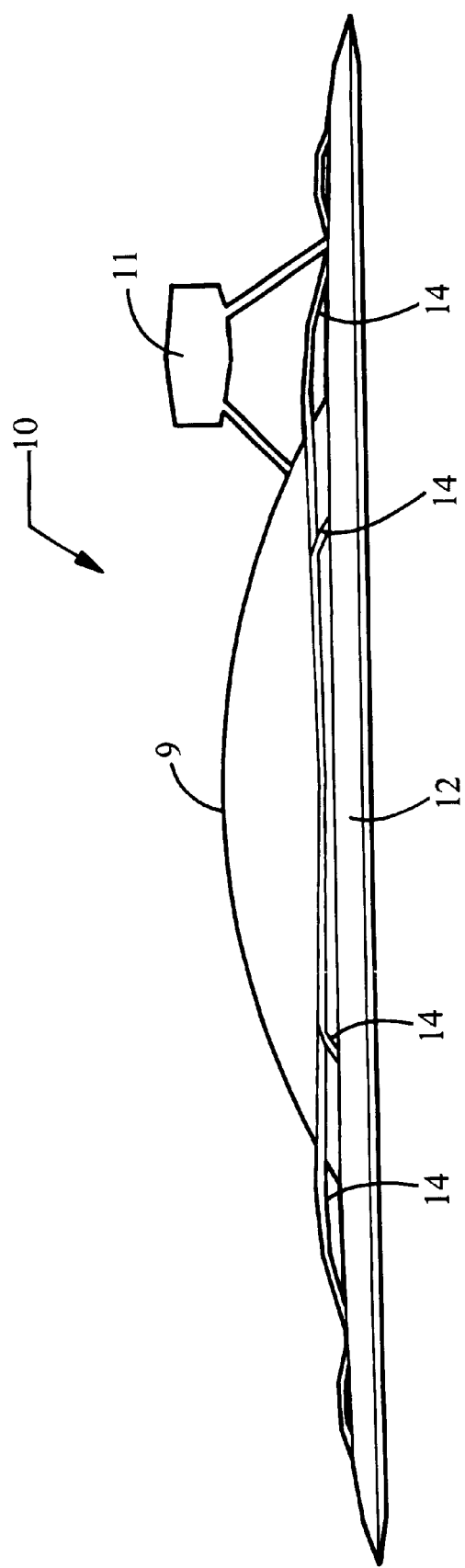
FIG. 1 is a side view of the aircraft in accordance with the instant invention.

Referring to FIG. 1, a vertical-lift/horizontal flight aircraft 10, in accordance with the present invention, comprises a central body compartment 9, a thrust unit 11, which is mounted aft of the body compartment and powered by a jet engine, a micro-turbine engine; with built-in generator; or a gas, diesel or electric powered ducted fan motor. Outer body lift surface 12 provides lift during horizontal flight and surrounds the aircraft 10 in the horizontal plane. Tubular attachment support members 14 provide support connectivity between central body compartment 9 and the lift assembly housing (not shown) and between the outer body lift surface 12 and the lift assembly housing (not shown).

Figure 2:
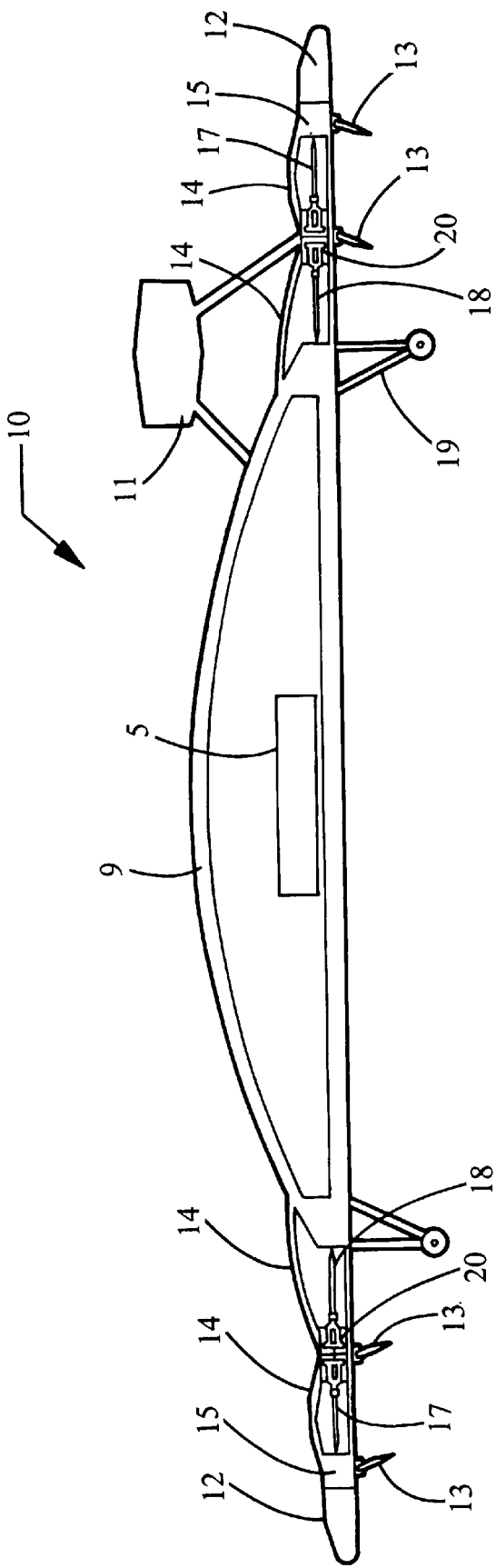
FIG. 2 is a cutaway side view of the aircraft in FIG. 1 in accordance with the instant invention.

Referring to FIG. 2, which shows a cutaway side view of aircraft 10, tubular attachment support members 14 provide connective support between central body compartment 9 and the lift assembly housing 20 and the outer body lift surface support housing 15, which supports outer body lift surface 12. Tubular support members 14 also perform as guide-way for the control circuitry; e.g. motor control mechanisms, electrical cabling, flight control cabling etc.; of aircraft 10. Central body compartment 9 houses power generation equipment 5; e.g. batteries, fuel cells etc.; and control equipment 6; e.g. navigational control equipment, motor control equipment etc.; for aircraft 10, and also provides storage space for any desired cargo. Further, directional guide flaps 13 are attached to the undersides of the lift assembly housing 20 and the outer body lift surface support housing 15 and adjacent to the inner lift blades 18 and outer lift blades 17. Directional guide flaps 13 are mounted on a swivel to allow rotation on a 180-degree axis and are positioned; e.g. by using electric servo motors; as necessary for flight control purposes. Landing gear equipment 19 are attached to the underside of central body compartment 9 and mounted on a swivel to allow folding under central body compartment 9 during flight. Alternatively, landing gear equipment 19 can consists of a tube structure that can be extended from the central body compartment for landing and retracted into central body compartment during flight. The outer drive ring lift blades 17 and the inner drive ring lift blades 18, which provide lift for the aircraft 10 through counter-rotating motion, are also shown. Outer body lift surface 12, which is shaped much like an aircraft wing provides lift during horizontal flight. Finally, an optional thrust unit 11 can be mounted aft of central body compartment 9 and powered by either a jet engine, a diesel, gas or electric motor ducted fan unit, or a micro-turbine.

Figure 3:
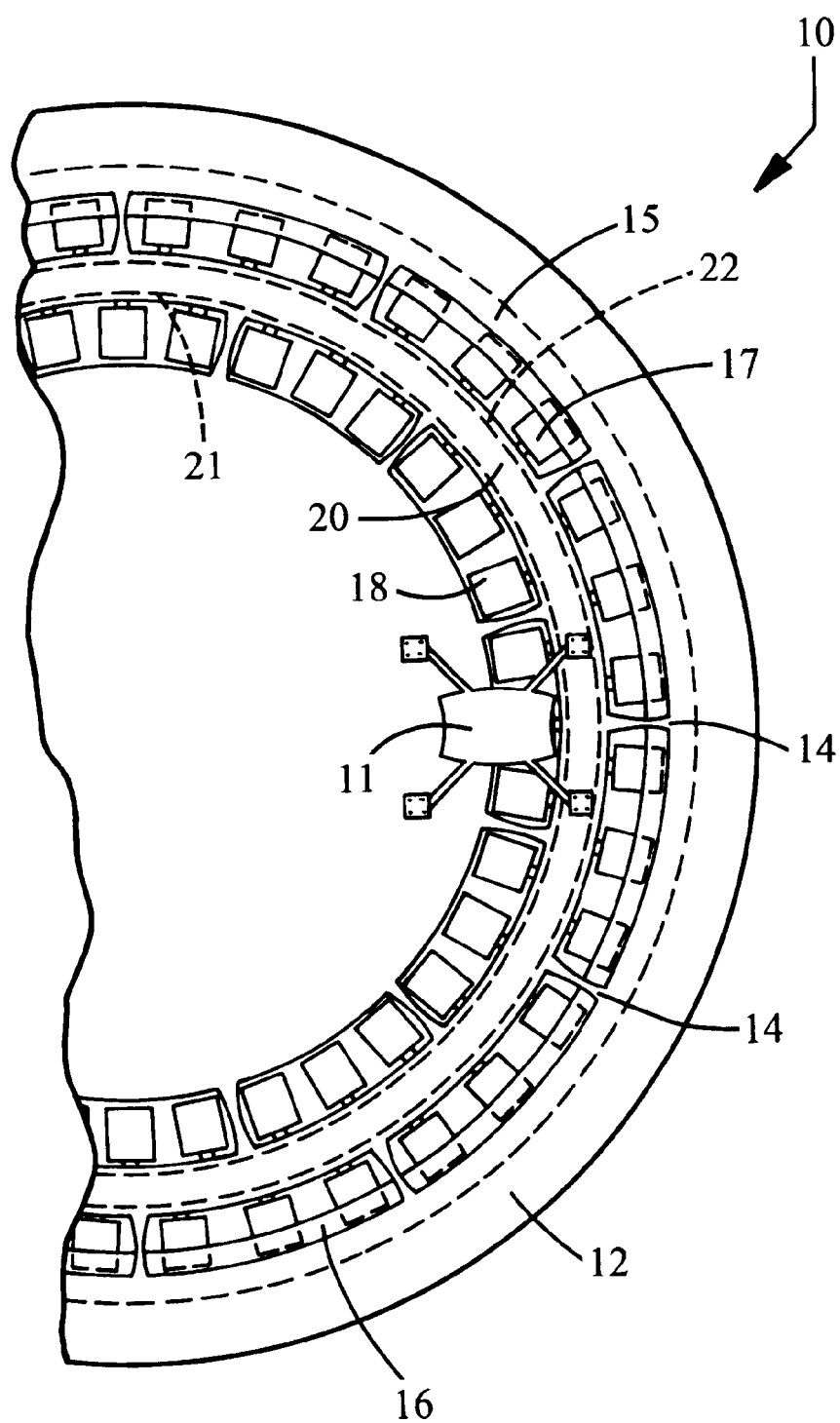
FIG. 3 is a partial top view of the aircraft of FIG. 1.

Referring to FIG. 3, a partial top view of the aircraft 10 reveals a preferred arrangement for tubular attachment members 14, thrust unit 11, outer body lift surface 12, outer lift assembly drive ring 22, inner lift assembly drive ring 21, outer lift assembly drive ring lift blades 17, inner lift assembly drive ring lift blades 18, lift assembly housing 20, and outer body lift surface support housing 15. Also shown, in a partially extended position, are lift assembly cover shields 16, which are storable in outer body lift surface 15 for vertical lift off and landing of aircraft 10 and can be extended to cover the lift assemblies; i.e. lift assembly housing 20, outer lift assembly drive ring 22, inner lift assembly drive ring 21, outer lift assembly drive ring lift blades 17, and inner lift assembly drive ring lift blades 18; during horizontal flight of aircraft 10.

Figure 4:
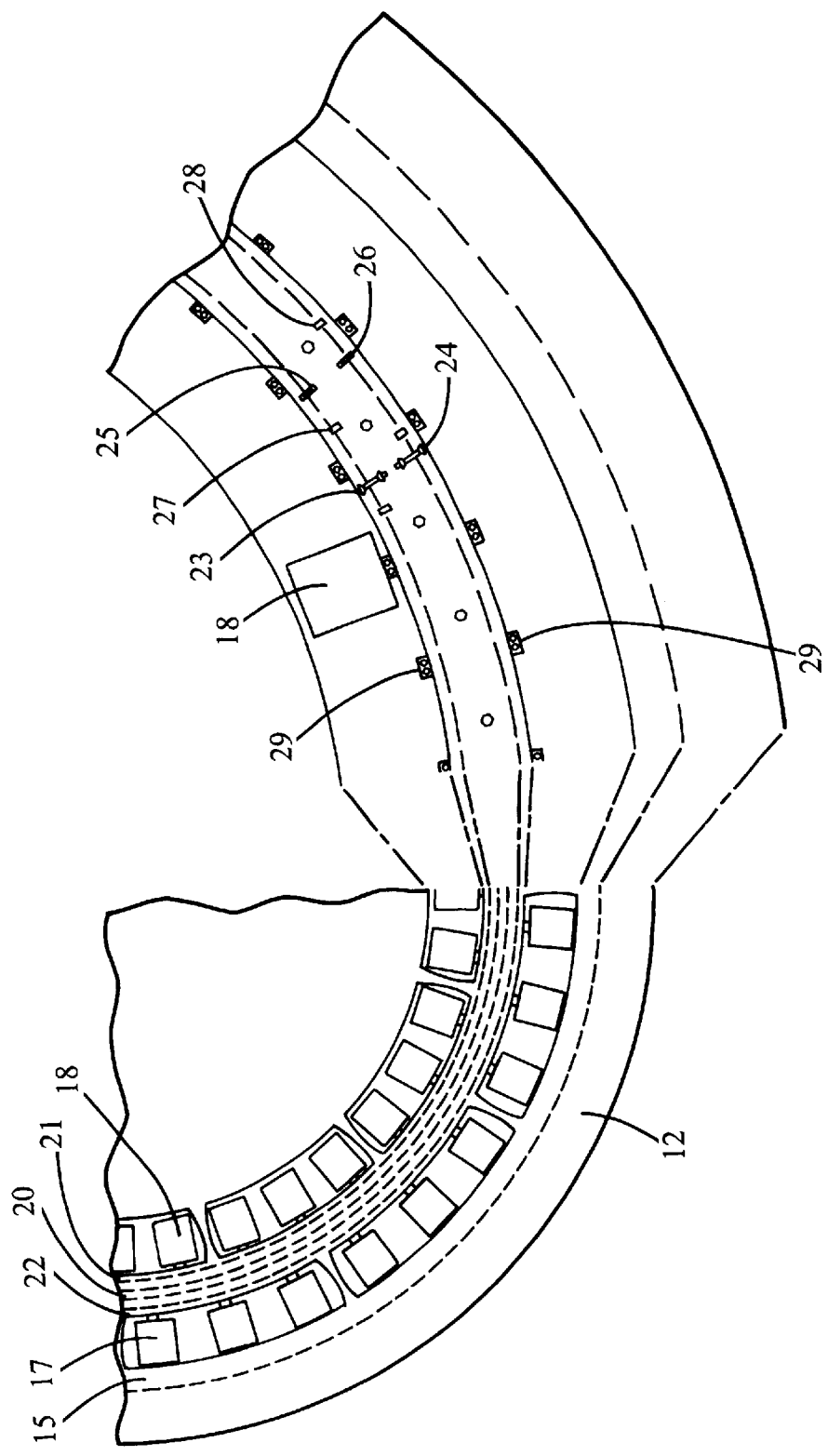
FIG. 4 is a partial top view of the aircraft of FIG. 1 with an exploded view of the lift assembly housing the inner and outer lift assembly drive rings.

Referring to FIG. 4 a second partial top view of the aircraft 10 is shown along with an exploded view of the inner lift assembly drive ring 21 and outer lift assembly drive ring 22. The inner lift assembly comprises, for example, drive ring support; via a plurality of tapered roller bearing support units 23; a plurality of inner lift assembly drive ring magnets 27 and at least one inner lift assembly electromagnetic drive motor 25. Similarly, the outer lift assembly comprises drive ring support; via a plurality of tapered roller bearing support units 24; a plurality of outer lift assembly drive ring magnets 28 and at least one outer lift assembly electromagnetic drive motor 26. Tapered roller bearing support units 23, 24 are mounted within the drive ring circular housing 20 and are used to secure the drive rings 21, 22 as they spin in a circular motion. The circular motion of drive rings 21, 22 is propelled, as is known in the art, by the interaction of electromagnetic motors 25, 26 and embedded magnets 27, 28. Further, this view exposes the inner lift assembly drive ring lift blades 18 and the outer lift assembly drive ring lift blades 17, which are attached, respectively, to inner lift assembly drive ring 21 and outer lift assembly drive ring 22 using lift blade attachment brackets 29. Lift blade attachment brackets 29 can secure lift blades 17, 18 in fixed positions or can allow for controlled variable positioning of lift blades 17, 18 via; e.g.; servo motor control.

Figure 5:
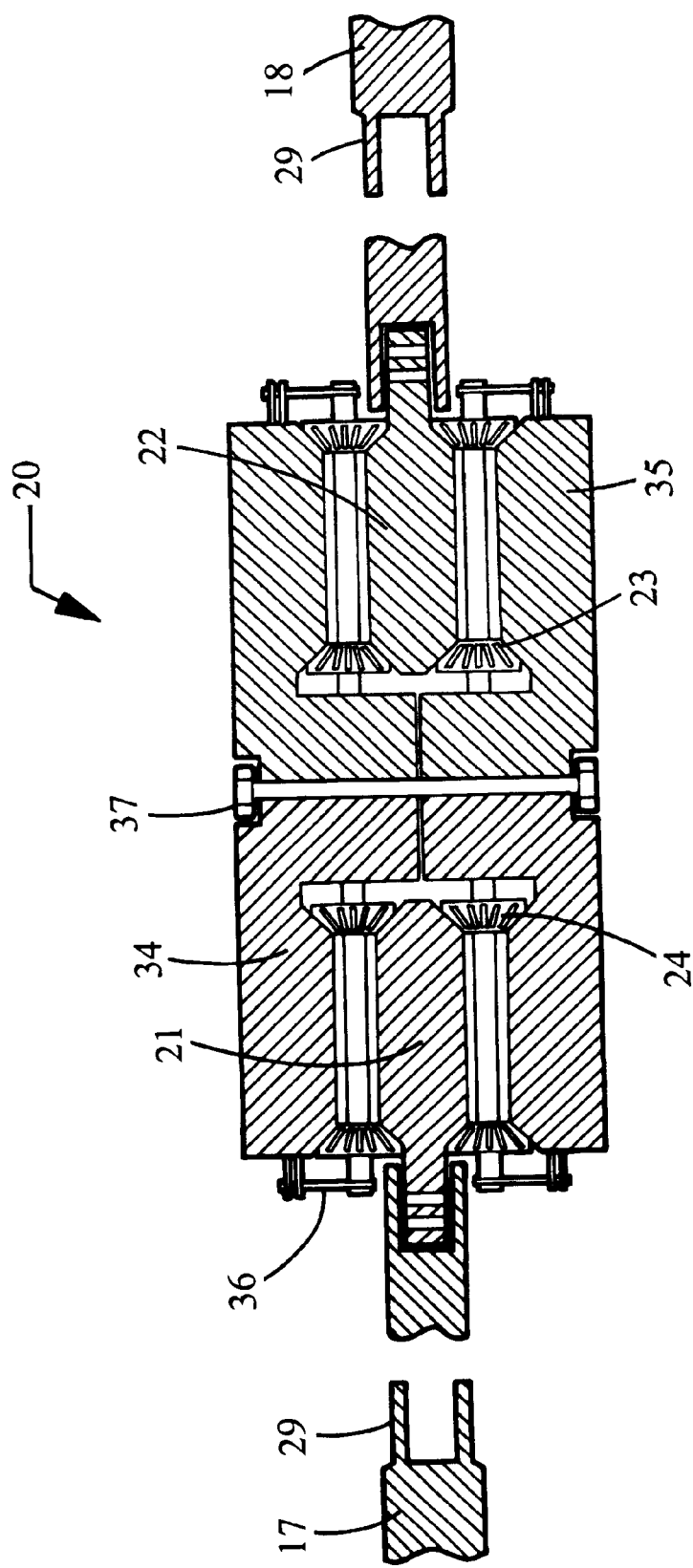
FIG. 5 is a cutaway side view of a first embodiment of the lift assembly housing and the internal components showing the tapered roller bearing for supporting the lift assembly drive rings, with attached lift blades.

FIG. 5 shows a cutaway side view of a first embodiment of lift assembly housing 20. Upper lift assembly housing 34 and lower lift assembly housing 35 enclose the support structure for the inner and outer lift assembly drive rings 21, 22; comprising tapered rolling bearing support units 23, 24 and drive rings 21, 22. A plurality of lift assembly housing bolts 37 are used to secure the upper lift assembly housing 34 to the lower lift assembly housing 35. Tapered rolling bearing support units 23, 24 are held in place by tapered roller bearings attachment brackets 36. FIG. 5 also shows outer lift assembly drive ring lift blades 17 and the inner lift assembly drive ring lift blades 18 and lift blade attachment brackets 29 which provide connection between lift blades 17, 18 and drive rings 21, 22.

Figure 6:
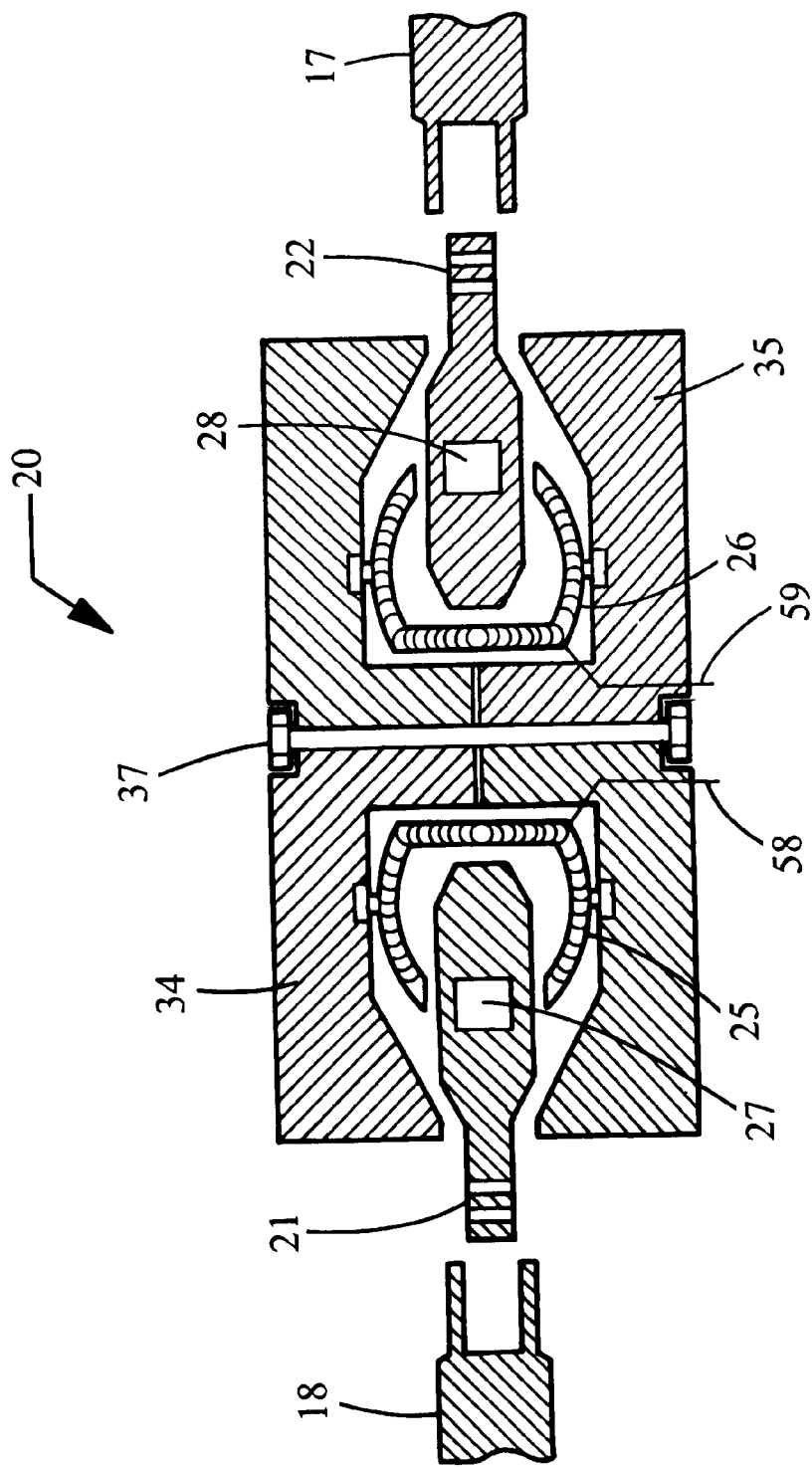
FIG. 6 is a second cutaway side view of the first embodiment of the lift assembly housing and the internal components showing the tapered roller bearings and the electromagnetic power unit for driving the lift assembly drive rings, with attached lift blades.

Referring to FIG. 6 a second cutaway side view of the first embodiment of lift assembly housing 20 is shown, depicting in particular electromagnetic motors 25, 26 and embedded magnets 27, 28. As also shown in FIG. 5 upper lift assembly housing 34 and the lower lift assembly housing 35 enclose the support structure for the inner and outer lift assembly drive rings 21, 22 and lift assembly housing bolts 37 are used to secure the upper lift assembly housing 34 to the lower lift assembly housing 35. Also shown is the arrangement of outer lift assembly electromagnetic drive motors 25, inner lift assembly electromagnetic drive motors 26, outer lift assembly drive ring magnets 28 and inner lift assembly drive ring magnets 27 along with outer lift assembly drive ring 21 and inner lift assembly drive ring 22. As mentioned previously, when electromagnetic motors 25, 26 are excited by an electrical current flowing through conductors 58, 59 and the drive ring magnets 27, 28 are in proximity to electromagnetic motors 25, 26 the resultant force causes the drive rings 21, 22 to counter-rotate, as is known in the art. Further, this spinning of the drive rings 21, 22 with the attached lift blades 17, 18 provide aircraft 10 with the power necessary for lift off and to assume horizontal flight.

Figure 7:
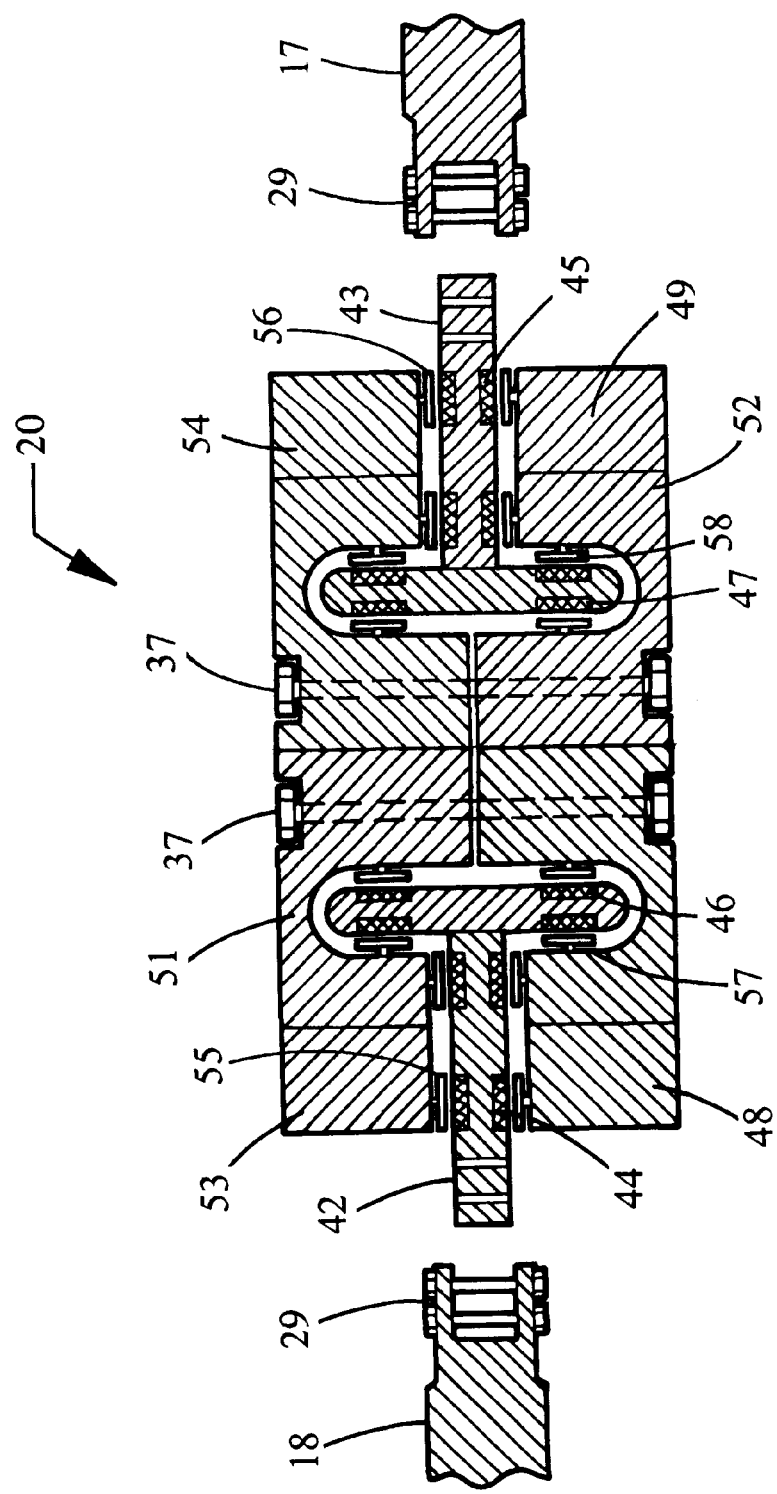
FIG. 7 is a cutaway side view of a second embodiment of the lift assembly housing and the internal components showing the levitated guide-way system for supporting the lift assembly drive rings, with attached lift blades.

Referring to FIG. 7 a second embodiment of lift assembly housing 20 is shown comprising upper levitated guide-way lift assembly housing 51 and the lower levitated guide-way lift assembly housing 52. A plurality of lift assembly housing bolts 37 are used to secure the upper levitated guide-way lift assembly housing 51 to the lower levitated guide-way lift assembly housing 52. Outer lift assembly levitated guide-way drive ring 42 and the inner lift assembly levitated guide-way drive ring 43 secure outer lift assembly drive ring lift blades 17 and inner lift assembly drive ring lift blades 18 via lift blade attachment brackets 29. Also shown are outer lift assembly horizontal levitated guide-way drive ring magnets 44; a plurality of which are embedded in drive ring 42; and inner lift assembly horizontal levitated guide-way drive ring magnets 45; a plurality of which are embedded in drive ring 43. Positioned opposite of each magnet 44, 45, and mounted on housing components 51, 52, are corresponding horizontal levitated guide-way electromagnetic devices 55, 56; which, when powered, provide a repelling force against magnets 44, 45 and cause drive rings 42, 43 to levitate between devices 55, 56. Further, are shown outer lift assembly vertical levitated guide-way magnets 46, a plurality of which are embedded in drive ring 42, and inner lift assembly vertical levitated guide-way magnets 47, a plurality of which are embedded in drive ring 43. Positioned opposite of each magnet 46, 47, and mounted on housing components 51, 52, are corresponding vertical levitated guide-way electromagnetic devices 57, 58; which, when powered, provide a repelling force against magnets 46, 47 and cause drive rings 42, 43 to levitate between devices 57, 58. Electrical power connections 48, 49, 53, 54 provide the necessary power to electromagnetic devices 55–58 that allows inner drive ring 42 and the outer drive ring 43 to float freely within lift assembly housing 20 on a magnetic levitation system, providing rotation in a frictionless environment.

Figure 8:
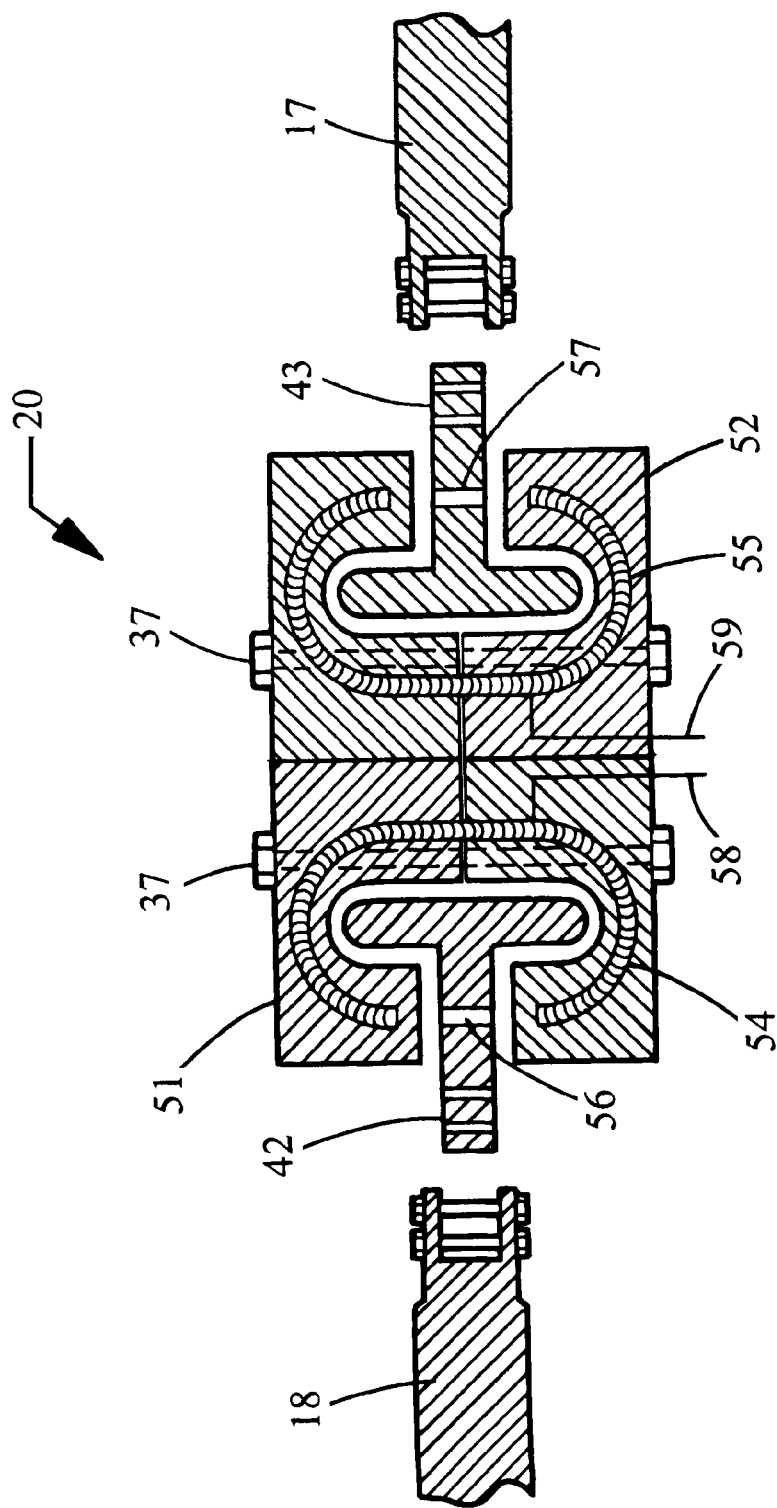
FIG. 8 is a second cutaway side view the second embodiment of the lift assembly housing and the internal components showing the levitated guide-way system and the electromagnetic power unit for driving the lift assembly drive rings, with attached lift blades.

Referring to FIG. 8 a second view of the second embodiment of lift assembly housing 20 depicts upper levitated guide-way lift assembly housing 51 and the lower levitated guide-way lift assembly housing 52 which are secured to each other with lift assembly housing bolts 37. Also shown are outer lift assembly levitated guide-way drive ring 42 and inner lift assembly levitated guide-way drive ring 43 which contain, respectively, a plurality of outer lift assembly levitated guide-way drive ring electrical power magnets 56 and a plurality of inner lift assembly levitated guide-way drive ring electrical power magnets 57. Electrical power connection 58 connects power to the plurality of outer lift assembly electromagnetic motors 54 and electrical power connection 59 connects power to the plurality of inner lift assembly electromagnetic motors 55. Inner drive ring 42 and the outer drive ring 43 float freely within lift assembly housing 20 on a magnetic levitation system, as discussed with reference to FIG. 7, which allows the drive rings to rotate in a frictionless environment. Electromagnetic motors 54, 55 provide a lightweight, efficient, high power system to propel the drive rings, with attached lift blades 17, 18 in a counter-rotation direction for a torque free vertical lift.

It will be apparent to those of skill in the art that the present invention is not limited to the details of the foregoing description and that alternative embodiments are possible without departing from the scope of the invention. The disclosed embodiments are intended to be descriptive and not limiting in nature, the scope of the instant invention being defined by the appended claims.

What is claimed is:

1. A vertical-lift/horizontal flight aircraft comprising:
   an airframe,
   a central body compartment,
   a lift assembly housing comprising an inner lift assembly including an inner lift assembly drive ring comprising embedded magnets, and an outer lift assembly including an outer lift assembly drive ring comprising embedded magnets, an outer body lift surface, and tubular attachment support members.

2. The vertical-lift/horizontal flight aircraft of claim 1 wherein said lift assembly housing further comprises:

at least one inner lift assembly electromagnetic motor, at least one outer lift assembly electromagnetic motor, said inner lift assembly drive ring further comprising inner lift blades, said outer lift assembly drive ring further comprising outer lift blades, wherein said inner and outer lift assembly drive rings counter-rotate with respect to each other.

3. The vertical-lift/horizontal flight aircraft of claim 2 further comprising:

a support system for said inner lift assembly drive ring and said outer lift assembly drive ring.

4. The vertical-lift/horizontal flight aircraft of claim 3 wherein said support system comprises a bearing system.

5. The vertical-lift/horizontal flight aircraft of claim 3 wherein said support system comprises a magnetic levitation system.

6. The vertical-lift/horizontal flight aircraft of claim 2 further comprising:

lift assembly cover shields, wherein said lift assembly cover shields are storable in the outer body lift surface during vertical lift off and are extendable as a cover over and under said inner lift assembly and said outer lift assembly during horizontal flight.

7. The vertical-lift/horizontal flight aircraft of claim 2 wherein said inner lift blades and said outer lift blades are secured, respectively, to said inner lift assembly drive ring and said outer lift assembly drive ring in fixed positions.

8. The vertical-lift/horizontal flight aircraft of claim 2 wherein said inner lift blades and said outer lift blades are secured, respectively, to said inner lift assembly drive ring and said outer lift assembly drive ring and have adjustable positions.

9. The vertical-lift/horizontal flight aircraft of claim 1 wherein said central body compartment further comprises:

a power generation unit, an electromagnetic motor control unit, and navigational control equipment.

10. The vertical-lift/horizontal flight aircraft of claim 1 wherein said tubular attachment support members comprise:

attachment support between said central body compartment and said lift assembly housing, a guide-way for housing aircraft control mechanisms and electrical cabling, and attachment support between said lift assembly housing and said outer body lift surface.

11. The vertical-lift/horizontal flight aircraft of claim 1 further comprising:

directional control guide flaps.

12. The vertical-lift/horizontal flight aircraft of claim 11 wherein said directional control guide flaps further comprise:

attachment to the under side of said lift assembly housing adjacent to said inner lift blades and said outer lift blades, swivel mounting to allow rotation on a 180-degree axis, and navigational equipment control via electric servo motors.

13. The vertical-lift/horizontal flight aircraft of claim 1 further comprising:

landing gear equipment attached to the underside of said central body compartment, and mounted on a swivel to allow folding said landing gear equipment under said central body compartment.

14. The vertical-lift/horizontal flight aircraft of claim 1 further comprising:

a thrust unit.

15. The vertical-lift/horizontal flight aircraft of claim 14 wherein said thrust unit comprises:

a jet engine.

16. The vertical-lift/horizontal flight aircraft of claim 14 wherein said thrust unit comprises:

a motor ducted fan unit.

17. The vertical-lift/horizontal flight aircraft of claim 14 wherein said thrust unit comprises:

a micro-turbine.

18. The vertical-lift/horizontal flight aircraft of claim 1 wherein said airframe is disc shaped.

* * * * *